3,287,469
NAPHTHYL- AND INDANYLIMIDAZOLINES
John Harvey, Jr., Wilmington, Del., assignor to E. I. du Pont de Nemours and Company, Wilmington, Del., a corporation of Delaware
No Drawing. Filed Sept. 27, 1963, Ser. No. 312,837
7 Claims. (Cl. 260—309.6)

This invention relates to partially reduced naphthylimidazolines and to indanylimidazolines.

More particularly, the compounds of this invention are partially reduced 2-(1-naphthyl)imidazolines and 2-(4-indanyl)imidazolines.

The disclosure herein should not be taken as a recommendation to use the disclosed invention in any way without full compliance with U.S. Food and Drug laws and other laws and governmental regulations which may be applicable.

The compounds of this invention have useful pharmaceutical properties and are useful, e.g., as sedatives, hypnotic agents and somnifacients. They are also useful as potentiators for central nervous system depressants. They generally have low toxicity and unexpectedly high therapeutic ratios.

The partially reduced 2-(1-naphthyl)imidazolines of this invention have the formula:

(1)

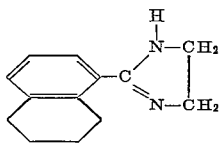

The 2-(4-indanyl)imidazolines of this invention have the formula:

(2)

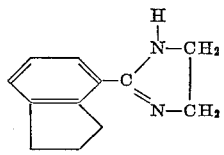

It is essential that the imidazoline group be attached as shown to the unsaturated ring of the reduced naphthyl or indanyl groups.

The compounds of this invention can be prepared by the condensation of ethylenediamine with 5,6,7,8-tetrahydro-1-naphthoic acid or 4-indanecarboxylic acid, respectively, or lower-alkyl esters of these acids, such as for example, the methyl ester, ethyl ester, propyl ester, isopropyl ester, butyl ester, pentyl ester, hexyl ester, etc.

The reaction is conveniently carried out by heating the ethylenediamine to about its reflux temperature and adding the appropriate acid or ester to the boiling liquid with subsequent heating at reflux for a suitable time. Other temperatures may be used, however, with a consequent increase or decrease in reaction time depending on the particular temperature and reactants used. Upon completion of the reaction, the reaction mixture is cooled and the product separated in conventional manner.

An alternative procedure for preparing the compounds of this invention involves the condensation of the mono-p-toluenesulfonate salt of ethylenediamine with 5,6,7,8-tetrahydro-1-naphthonitrile or 4-indanecarbonitrile. This reaction is conducted similar to the condensation described above, and the product separated in conventional manner.

It is specifically intended to include within the purview of the present invention the acid addition and quaternary ammonium salts which the above compounds form with pharmaceutically acceptable anions. The term "pharmaceutically acceptable anion" has a definite meaning to one skilled in the art. Suitable acid addition salts include for example the tartrate, nitrate, sulfate, hydrochloride, hydrobromide, hydroiodide, acetate, succinate, maleate, citrate, and the like. Suitable quaternary ammonium salts include for example the dimethylsulfate, ethyl bromide, methiodide, propyl chloride, and the like. The salts may readily be prepared by contacting an ethereal solution of the free imidazoline with the acid or quaternizing material and separating the resulting salt.

The agents of this invention may be administered alone but are generally administered with a pharmaceutical carrier selected on the basis of the chosen route of administration and standard pharmaceutical practice. For example, they may be administered orally in the form of tablets or capsules containing such excipients as starch, milk sugar, certain types of clay, etc. They may be administered orally in the form of elixirs or oral suspensions which may contain coloring and flavoring agents. They may be injected parenterally and for this use may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

The compounds of this invention will be administered in a dosage generally of the same or lower order of magnitude as with other pharmaceutical agents having the same types of desired activity.

In certain instances it may be found that because of their high order of activity the optimum dosage of the compounds of this invention will be lower than the optimum dosage of other compounds generally recommended for the same use. In general, the physician or veterinarian will determine the dosage which will be most suitable for a particular application, and as might be expected, it will vary with the age, weight and general health of the patient under treatment and with various other factors which will be determined by the physician or veterinarian in attendance. When they are administered orally a larger quantity will be required to produce the same effect as a smaller quantity given parenterally. Parental administration of from 0.1 mg. to 250 mg. of active agent should be suitable.

The compositions of this invention may take a variety of forms. Various diluents may be employed and the percentage of active ingredients may be varied. It is necessary that an active ingredient form a proportion of the composition such that a suitable dosage form will be obtained. Obviously several dosage unit forms may be administered at about the same time. Although compositions with less than 0.005% by weight of active ingredient are suitable, it is preferred to use compositions containing not less than 0.005% of the active agent because otherwise the amount of carrier becomes excessively large. Activity increases with the concentration of the active agent. The percentage by weight of active agent may be 10, 50, 75, 95% or even higher. Dosage unit forms may be prepared with a minor proportion of a carrier and a major proportion of active materials and vice-versa.

Administration can be by vapor or spray applications through the mouth or nasal passages, especially for anticongestant effect.

The following examples are given solely for the purpose of illustration and are not to be construed as limitations of this invention, many variations of which are possible without departing from the spirit or scope thereof.

*Example 1*

One hundred fifty-seven parts by weight (1 mole) of 5,6,7,8-tetrahydro-1-naphthonitrile and 464 parts by weight (2 moles) of ethylenediamine p-toluenesulfonate are mixed and heated at 200–210° C. for 2 hours. The mixture is then dissolved in aqueous HCl and the solution washed with ether. The resulting aqueous layer is made basic with ammonium hydroxide and the solid 2-(5,6,7,8-tetrahydro-1-naphthyl)imidazoline product is collected on a filter.

*Example 2*

Example 1 is repeated using a corresponding molar amount of 4-indanecarbonitrile in place of the 5,6,7,8-tetrahydro-1-naphthonitrile of that example, to obtain 2-(4-indanyl)imidazoline in like fashion.

The invention claimed is:

1. A compound selected from the group consisting of 2-(5,6,7,8-tetrahydro-1-naphthyl)-2-imidazoline and 2-(4-indanyl)-2-imidazoline and their non-toxic acid addition and quaternary ammonium salts.

2. 2-(5,6,7,8-tetrahydro-1-naphthyl)-2-imidazoline.

3. 2-(5,6,7,8-tetrahydro-1-naphthyl)-2-imidazoline hydrochloride.

4. 2-(5,6,7,8-tetrahydro-1-naphthyl)-2-imidazoline hydrobromide.

5. 2-(4-indanyl)-2-imidazoline.

6. 2-(4-indanyl)-2-imidazoline hydrochloride.

7. 2-(4-indanyl)-2-imidazoline hydrobromide.

References Cited by the Examiner

UNITED STATES PATENTS

| | | | |
|---|---|---|---|
| 2,680,745 | 6/1954 | Craig et al. | 260—309.6 |
| 2,778,836 | 1/1957 | Morren | 260—309.6 |
| 2,842,478 | 7/1958 | Gardocki et al. | 260—309.6 |
| 2,846,411 | 8/1958 | Meyer et al. | 260—565 |
| 2,867,625 | 1/1959 | Ham et al. | 260—309.6 |
| 3,024,166 | 3/1962 | Kuna et al. | 167—65 |
| 3,036,955 | 5/1962 | Kuna et al. | 167—65 |

FOREIGN PATENTS

| | | |
|---|---|---|
| 167,100 | 11/1950 | Austria. |
| 204,737 | 8/1939 | Switzerland. |
| 213,368 | 5/1941 | Switzerland. |

WALTER A. MODANCE, *Primary Examiner.*

NICHOLAS S. RIZZO, *Examiner.*

N. TROUSOF, *Assistant Examiner.*